United States Patent
Hockett et al.

(10) Patent No.: US 9,871,706 B2
(45) Date of Patent: *Jan. 16, 2018

(54) INTELLIGENTLY MANAGING PATTERN CONTENTS ACROSS MULTIPLE RACKS BASED ON WORKLOAD AND HUMAN INTERACTION USAGE PATTERNS

(71) Applicant: International Business Machines Corporation, Armonk, NY (US)

(72) Inventors: Hugh E. Hockett, Raleigh, NC (US); Aaron J. Quirk, Cary, NC (US); Lin Sun, Morrisville, NC (US); Andre Tost, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 264 days.

This patent is subject to a terminal disclaimer.

(21) Appl. No.: 14/684,398

(22) Filed: Apr. 12, 2015

(65) Prior Publication Data

US 2016/0105498 A1 Apr. 14, 2016

Related U.S. Application Data

(63) Continuation of application No. 14/509,531, filed on Oct. 8, 2014.

(51) Int. Cl.
*H04L 12/26* (2006.01)
*H04L 29/08* (2006.01)
(Continued)

(52) U.S. Cl.
CPC .............. *H04L 43/02* (2013.01); *H04L 43/04* (2013.01); *H04L 67/1023* (2013.01);
(Continued)

(58) Field of Classification Search
None
See application file for complete search history.

(56) References Cited

U.S. PATENT DOCUMENTS

| 6,401,238 B1 * | 6/2002 | Brown | G06F 8/61 |
| | | | 709/224 |
| 7,003,560 B1 * | 2/2006 | Mullen | G06Q 10/06 |
| | | | 709/223 |

(Continued)

FOREIGN PATENT DOCUMENTS

WO 2013058764 A1 4/2013

OTHER PUBLICATIONS

Putnam et al. A reconfigurable fabric for accelerating large-scale datacenter services. ISCA '14: Proceeding of the 41st annual international symposium on computer architecture. IEEE press. Jun. 2014. pp. 13-24.*

(Continued)

*Primary Examiner* — Jeffrey R Swearingen
(74) *Attorney, Agent, or Firm* — Robert A. Voigt, Jr.; Winstead, P.C.

(57) ABSTRACT

A method, system and computer program product for managing pattern contents across multiple racks. The workload usage characteristics of the pattern contents on a primary rack in a domain of racks are collected based on monitoring the workload usage of the pattern contents in the pattern definition and in the deployed pattern. Furthermore, information regarding use of the pattern definition, the deployed pattern and the pattern contents by users ("human interaction usage patterns") is collected based on monitoring the human interaction usage patterns. The pattern contents are then ranked based on analyzing the collected workload usage characteristics and analyzing the collected information regarding human interaction usage patterns. Once the pattern contents are ranked, those contents that are highly (Continued)

ranked are deemed to be more likely to be utilized in the pattern and therefore are the contents that are copied from the primary rack to the other racks of the domain.

5 Claims, 6 Drawing Sheets

(51) Int. Cl.
*H04W 4/00* (2009.01)
*H04L 12/24* (2006.01)

(52) U.S. Cl.
CPC ......... *H04W 4/003* (2013.01); *H04L 41/0663* (2013.01); *H04L 41/5019* (2013.01)

(56) References Cited

U.S. PATENT DOCUMENTS

| | | |
|---|---|---|
| 7,765,299 B2 | 7/2010 | Romero |
| 8,040,811 B2 * | 10/2011 | Edwards ................ H04L 41/22 709/224 |
| 8,631,088 B2 | 1/2014 | Robbin et al. |
| 2002/0065864 A1 * | 5/2002 | Hartsell .............. H04L 41/5009 709/223 |
| 2012/0116590 A1 | 5/2012 | Florez-Larrahondo et al. |
| 2012/0259977 A1 * | 10/2012 | Gerovac ............... G06F 9/5083 709/224 |
| 2013/0238777 A1 * | 9/2013 | Raleigh .............. H04L 67/1097 709/223 |

OTHER PUBLICATIONS

List of IBM Patents or Patent Applications Treated as Related, Apr. 12, 2015, pp. 1-2.

Office Action for U.S. Appl. No. 14/509,531 dated Jan. 11, 2017, pp. 1-17.

Mell et al., "The NIST Definition of Cloud Computing," Special Publication 800-145, Sep. 2011, pp. 1-7.

Office Action for U.S. Appl. No. 14/509,531 dated May 5, 2017, pp. 1-14.

* cited by examiner

US 9,871,706 B2

INTELLIGENTLY MANAGING PATTERN CONTENTS ACROSS MULTIPLE RACKS BASED ON WORKLOAD AND HUMAN INTERACTION USAGE PATTERNS

TECHNICAL FIELD

The present invention relates generally to cloud computing, and more particularly to intelligently managing pattern contents across multiple racks based on workload and human interaction usage patterns.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services. The functions of the cloud computing environment are performed by a data center, which includes various types of hardware components (e.g., storage controllers, network switches, physical compute machines or nodes) stored in racks.

An administrator of the cloud computing environment may build a reusable pattern which defines the topology and application environment used to service the customer (i.e., the user receiving the services provided by the cloud computing environment) as well as satisfies the customer requirements, such as application and processing requirements. The pattern is an abstract model of the topology and application environment that encapsulates the installation, configuration and management of middleware and applications, such as the middleware and applications that run on virtual machines in the physical compute nodes. Such a pattern can be deployed repeatedly thereby avoiding the need to provision these environments individually and manually.

Currently, a pattern may be deployed on multiple racks (commonly referred to as a "domain") to increase support for high availability and disaster recovery. For example, a pattern consisting of a set of virtual machines and the software running on these virtual machines is deployed on each rack within a "domain" of racks. In this manner, the workload handled by the virtual machines of the pattern on a rack that fails may be routed to be handled by the virtual machines of the pattern on another rack of the domain.

The content of the pattern, such as the operating system images, middleware binaries and other artifacts, may be obtained from external repositories. While fetching such content from external repositories may be possible, the performance of the system may be diminished due to the time it takes to retrieve such content, especially if such content (e.g., operating system image) is stored in very large files (e.g., multiple gigabytes). Furthermore, a rack may be rendered non-operational in situations where the external repository failed or the network connection to the external repository from the rack was interrupted. As a result, there has been a preference to store the content needed for pattern deployments on all of the racks of the domain locally.

However, there is not currently a means for determining which content is necessarily needed for pattern deployment on these racks. Neither is there currently a means for transferring such content from one of the racks of the domain to the other racks of the domain so that they all contain the same content in an order based on priority. Since a rack may fail or the network connection to the rack may be interrupted, it may be wise to transfer those contents that are most important prior to those that are less important.

BRIEF SUMMARY

In one embodiment of the present invention, a method for managing pattern contents across multiple racks comprises monitoring workload usage of contents of a pattern in a pattern definition and in a deployed pattern, where the pattern is a model of a topology and application environment that encapsulates installation, configuration and management of middleware and applications and where the pattern definition is the pattern defined by a user. The method further comprises monitoring usage of the pattern definition, the deployed pattern and the contents of the pattern by users. The method additionally comprises collecting the workload usage characteristics of the contents of the pattern on a primary rack in a domain of racks based on the monitoring of the workload usage of the contents of the pattern in the pattern definition and in the deployed pattern. Furthermore, the method comprises collecting information regarding use of the pattern definition, the deployed pattern and the contents of the pattern by the users on the primary rack in the domain of racks based on the monitoring of the usage of the pattern definition, the deployed pattern and the contents of the pattern by the users. Additionally, the method comprises ranking, by a processor, the contents of the pattern by analyzing the collected workload usage characteristics of the contents of the pattern on the primary rack in the domain of racks and analyzing the collected information regarding use of the pattern definition, the deployed pattern and the contents of the pattern by the users. In addition, the method comprises copying a subset of the contents of the pattern on the primary rack to one or more other racks in the domain of racks based on the ranking.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
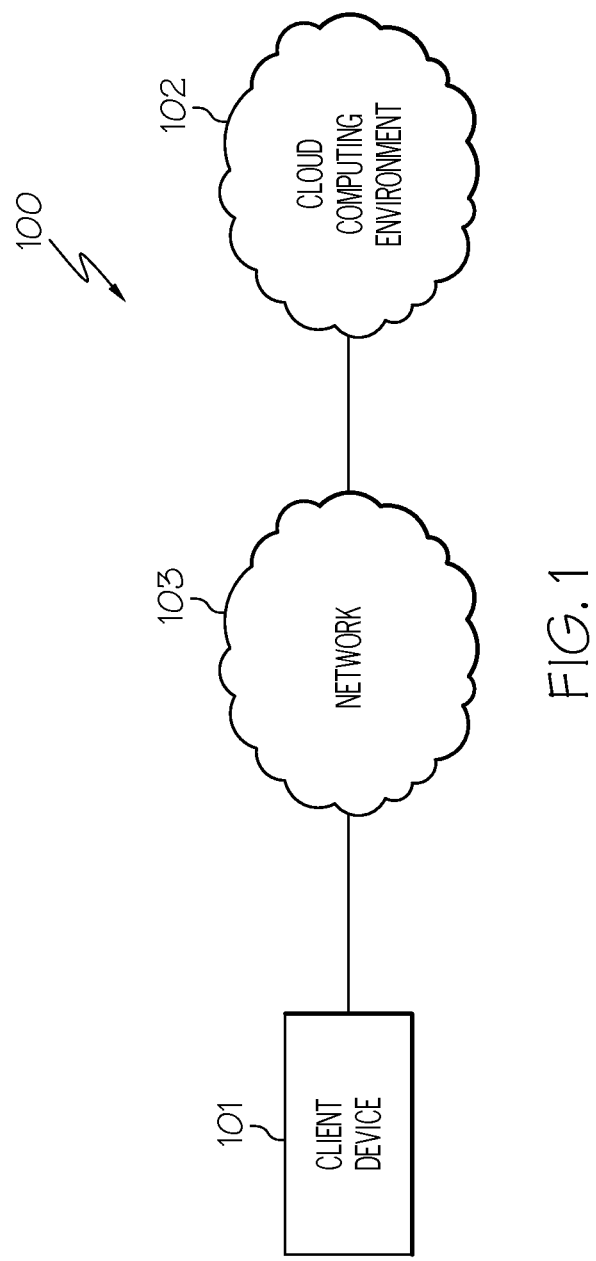
FIG. 1 illustrates a network system configured in accordance with an embodiment of the present invention.

The present invention comprises a method, system and computer program product for managing pattern contents across multiple racks. In one embodiment of the present invention, the workload usage of the pattern contents (e.g., images, scripts) in a pattern definition and in a deployed pattern is monitored. A "pattern definition" refers to the pattern defined by the user (i.e., the user receiving the services provided by the cloud computing environment). The "deployed pattern" refers to the middleware and applications that were actually deployed across the multiple racks which may be different from the middleware and applications defined in the pattern definition. Examples of monitoring the workload usage of the pattern contents include monitoring the extent of utilization of these contents. Furthermore, the use of the pattern definition, the deployed pattern and the pattern contents by users are monitored (collectively referred to as monitoring the "human interaction usage patterns"). For example, monitoring the human interaction usage patterns may involve monitoring actions, such as edits to the pattern definition and execution of the script packages during the pattern deployment. The workload usage characteristics of the pattern contents on a primary rack in a domain of racks and information regarding the human interaction usage patterns on the primary rack in the domain of racks are collected. Furthermore, the service level agreement applied to the pattern, the historic usages of the pattern contents and/or the popularity of the pattern contents are obtained. The pattern contents are then ranked by analyzing the collected workload usage characteristics of the pattern contents on the primary rack, analyzing the collected information regarding the use of the pattern definition, the deployed pattern and the pattern contents by the users on the primary rack as well as analyzing the service level agreement applied to the pattern, historic usages of pattern contents and/or popularity of pattern contents. For example, contents that are more utilized and popular would be ranked higher than contents that are less utilized or less popular. Once the pattern contents are ranked, such ranking may be used in many ways, such as by determining the contents that would most likely be utilized in the pattern. Those contents that are highly ranked are deemed to be more likely to be utilized in the pattern and therefore are the contents that are copied from the primary rack to the local repository of the other rack(s) in the domain and not storing contents that are not needed thereby freeing up space. Furthermore, the pattern contents may be transferred or updated in an order based on the ranking thereby transferring or updating those contents that are most important prior to those that are less important thereby preventing the loss of such contents in case of a rack failure or a network connection interruption.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
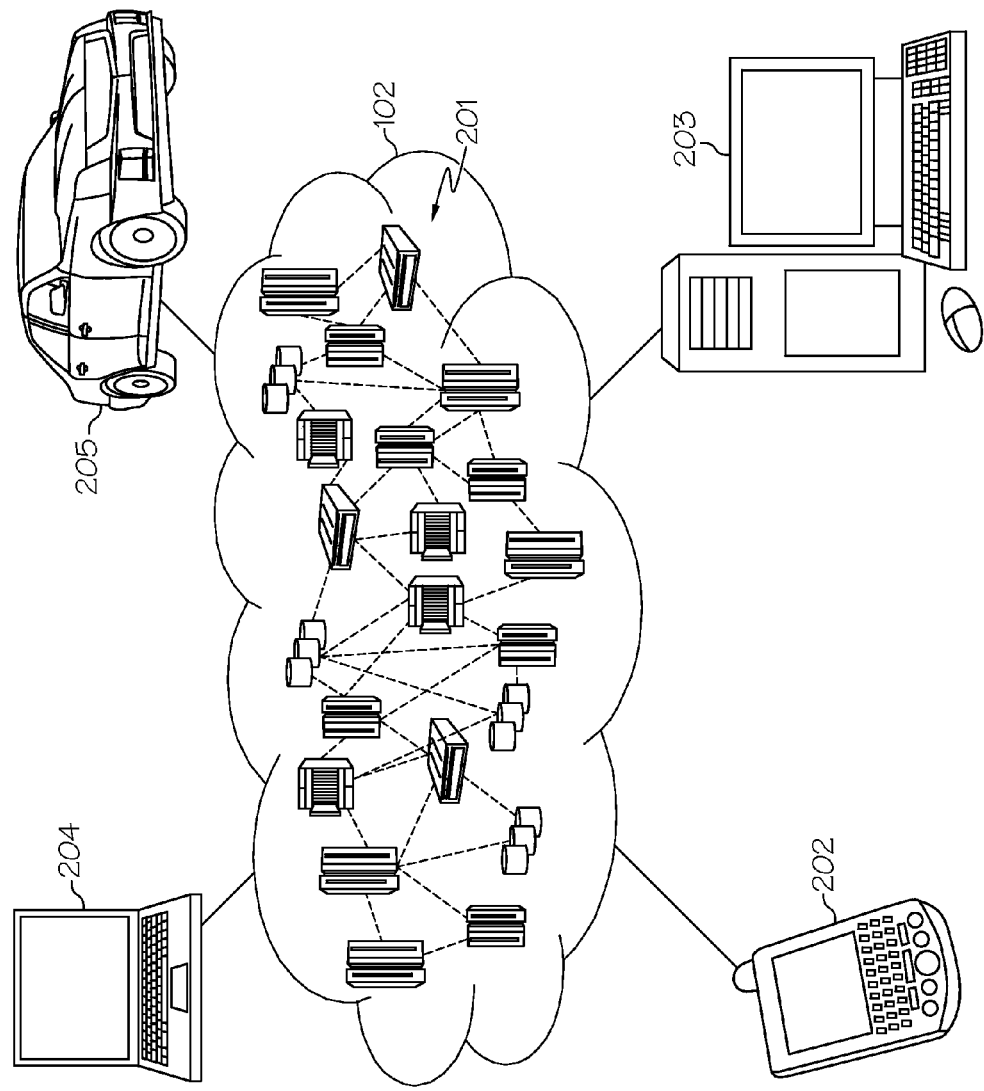
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, Personal Digital Assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of exemplary cloud computing nodes 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing node 201 may store program code on a computer readable storage medium on the server computer. The server computer may download the program code to computing device 202, 203, 204, 205 for use on the computing device.

Figure 3:
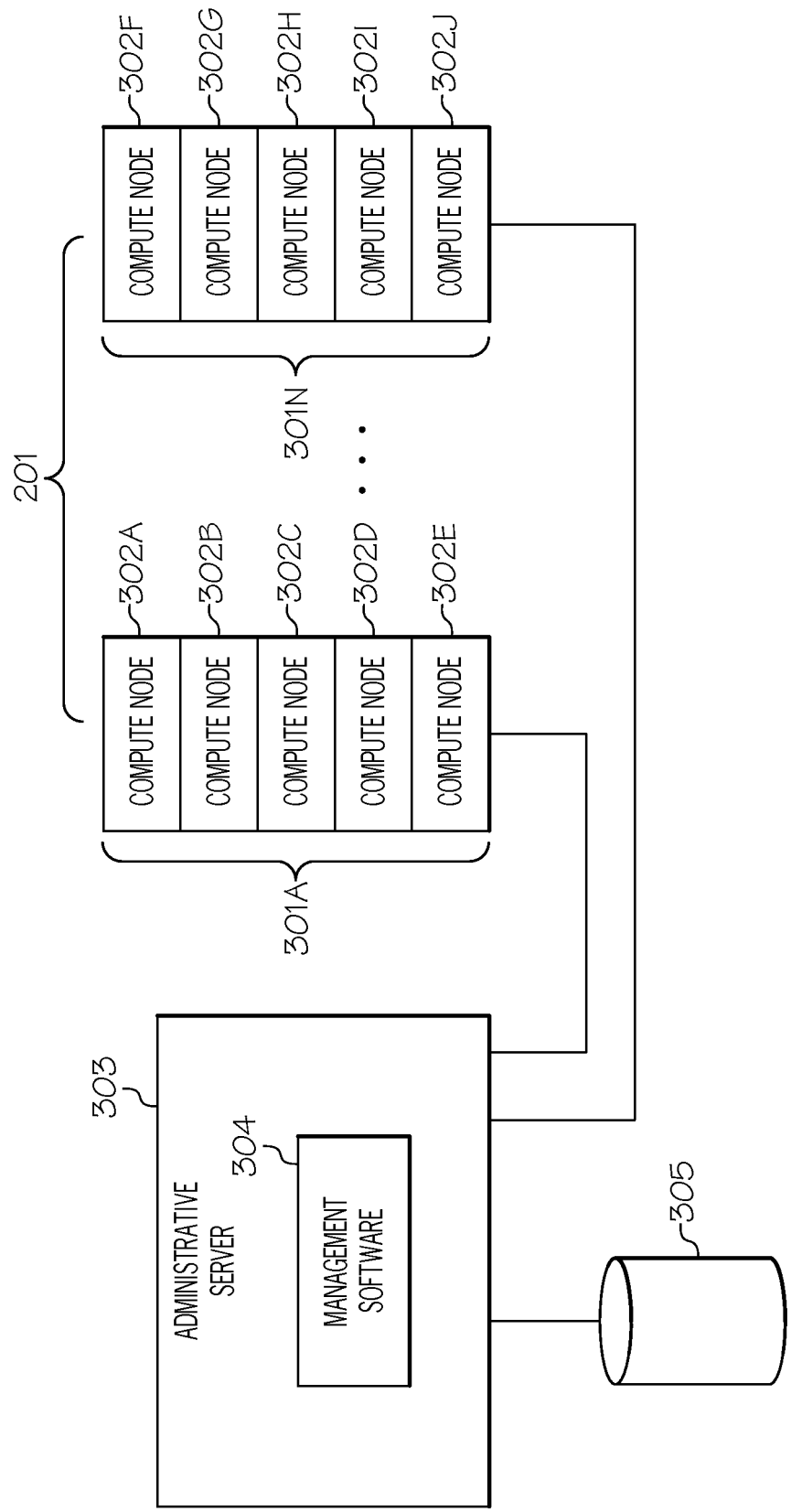
FIG. 3 illustrates a schematic of racks of compute nodes of the cloud computing node that are managed by an administrative server in accordance with an embodiment of the present invention.

Referring now to FIG. 3, FIG. 3 illustrates a schematic of a rack of compute nodes (e.g., servers) of a cloud computing node 201 that are managed by an administrative server in accordance with an embodiment of the present invention.

As shown in FIG. 3, cloud computing node 201 may include racks 301A-301N, where N is a positive integer number, of hardware components or "compute nodes," such as servers or other electronic devices. For example, rack 301A houses compute nodes 302A-302E and rack 301N houses compute nodes 302F-302J. Racks 301A-301N may collectively or individually be referred to as a racks 301 or rack 301, respectively. Compute nodes 302A-302J may collectively or individually be referred to as compute nodes 302 or compute node 302, respectively. An illustrative virtualization environment for compute node 302 is discussed further below in connection with FIG. 4. FIG. 3 is not to be limited in scope to the number of racks 301 or compute nodes 302 depicted. For example, cloud computing node 201 may be comprised of any number of racks 301 which may house any number of compute nodes 302. Furthermore, while FIG. 3 illustrates rack 301 housing compute nodes 302, rack 301 may house any type of computing component that is used by cloud computing node 201. Furthermore, while the following discusses compute node 302 being confined in a designated rack 301, it is noted for clarity that compute nodes 302 may be distributed across cloud computing environment 102 (FIGS. 1 and 2).

As further shown in FIG. 3, racks 301 are coupled to an administrative server 303 configured to provide data center-level functions. Administrative server 303 supports a module, referred to herein as the management software 304, that can be used to manage all the compute nodes 302 of cloud computing node 201, monitor system utilization, intelligently deploy images of data and optimize the operations of cloud computing environment 102. Management software 304 may further be configured to manage the pattern contents across multiple racks based on workload and human interaction usage patterns as discussed further below in connection with FIG. 6. A description of the hardware configuration of administrative server 303 is provided further below in connection with FIG. 5.

Furthermore, as shown in FIG. 3, administrative server 303 is connected to a database 305 configured to store the service level agreements applied to the pattern, the historic usages of the pattern contents and/or the popularity of the pattern contents. Such information, such as the service level agreements, may be obtained from the user that is receiving the services provided by cloud computing environment 102. Other information, such as the historic usages of the pattern contents and/or the popularity of the pattern contents may be obtained from past monitoring of the pattern contents as well as from user reviews of the pattern contents.

As discussed in further detail below, a compute node 302 may function as a local repository for storing the contents of a pattern for a rack 301 in a "domain" of racks. A "pattern," as used herein, refers to an abstract model of the topology and application environment that encapsulates the installation, configuration and management of middleware and applications, such as the middleware and applications that run on virtual machines in physical compute nodes 302. The contents of a pattern may include images, files, middleware binaries, scripts, plug-ins (contain the components, policies and links of the virtual application pattern, where a virtual application pattern is a complete set of platform resources that fulfill a business need, including web applications, databases, user registries, messaging services and transaction processes) and pattern types (collection of plug-ins). In one embodiment, the same pattern may be deployed on multiple racks 301 (e.g. racks 301A, 301N), where such racks 301 are said to be in a "domain" of racks 301.

Figure 4:
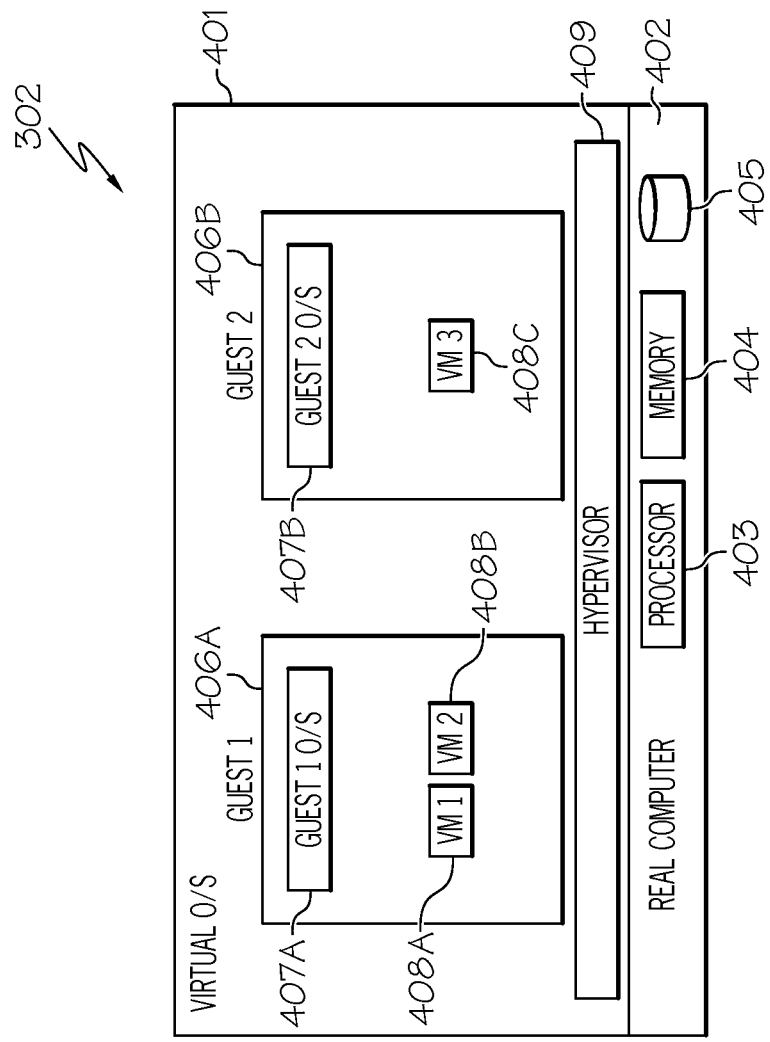
FIG. 4 illustrates a virtualization environment for the compute node in accordance with an embodiment of the present invention.

Referring now to FIG. 4, FIG. 4 illustrates a virtualization environment for compute node 302 (FIG. 3) in accordance with an embodiment of the present invention. Compute node 302 includes a virtual operating system 401. Operating system 401 executes on a real or physical computer 402. Real computer 402 includes one or more processors 403, a memory 404 (also referred to herein as the host physical memory), one or more disk drives 405 and the like. Other components of real computer 402 are not discussed herein for the sake of brevity.

Virtual operating system 401 further includes user portions 406A-406B (identified as "Guest 1" and "Guest 2," respectively, in FIG. 4), referred to herein as "guests." Each guest 406A, 406B is capable of functioning as a separate system. That is, each guest 406A-406B can be independently reset, host a guest operating system 407A-407B, respectively, (identified as "Guest 1 O/S" and "Guest 2 O/S," respectively, in FIG. 4) and operate with different programs. An operating system or application program running in guest 406A, 406B appears to have access to a full and complete system, but in reality, only a portion of it is available. Guests 406A-406B may collectively or individually be referred to as guests 406 or guest 406, respectively. Guest operating systems 407A-407B may collectively or individually be referred to as guest operating systems 407 or guest operating system 407, respectively.

Each guest operating system 407A, 407B may host one or more virtual machine applications 408A-408C (identified as "VM 1," "VM 2" and "VM 3," respectively, in FIG. 4), such as Java™ virtual machines. For example, guest operating system 407A hosts virtual machine applications 408A-408B. Guest operating system 407B hosts virtual machine application 408C. Virtual machines 408A-408C may collectively or individually be referred to as virtual machines 408 or virtual machine 408, respectively.

Virtual operating system 401 further includes a common base portion 409, referred to herein as a hypervisor. Hypervisor 409 may be implemented in microcode running on processor 403 or it may be implemented in software as part of virtual operating system 401. Hypervisor 409 is configured to manage and enable guests 406 to run on a single host.

As discussed above, virtual operating system 401 and its components execute on physical or real computer 402. These software components may be loaded into memory 404 for execution by processor 403.

The virtualization environment for compute node 302 is not to be limited in scope to the elements depicted in FIG. 4. The virtualization environment for compute node 302 may include other components that were not discussed herein for the sake of brevity.

Figure 5:
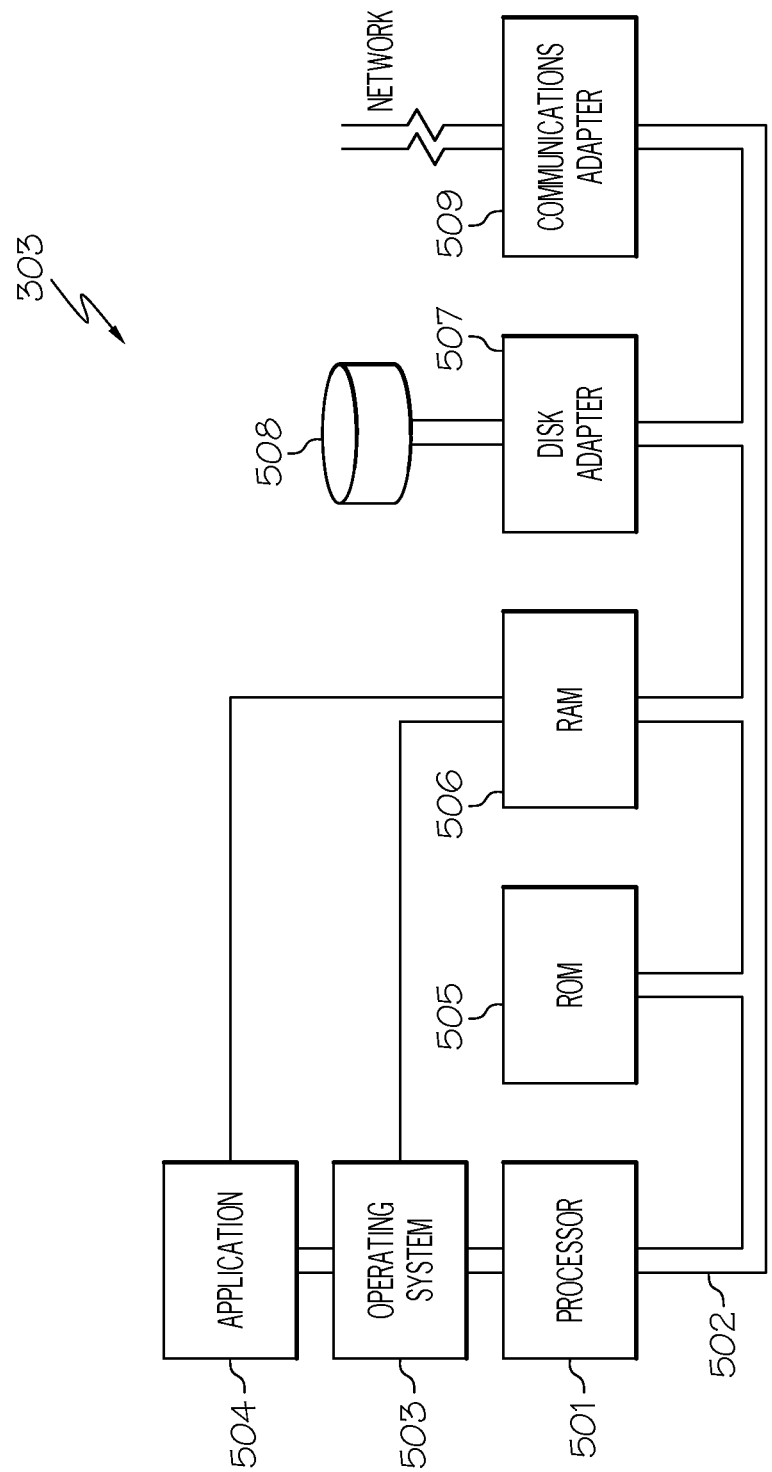
FIG. 5 illustrates a hardware configuration of the administrative server configured in accordance with an embodiment of the present invention.

Referring now to FIG. 5, FIG. 5 illustrates a hardware configuration of administrative server 303 (FIG. 3) which is representative of a hardware environment for practicing the present invention. Administrative server 303 has a processor 501 coupled to various other components by system bus 502. An operating system 503 runs on processor 501 and provides control and coordinates the functions of the various components of FIG. 5. An application 504 in accordance with the principles of the present invention runs in conjunction with operating system 503 and provides calls to operating system 503 where the calls implement the various functions or services to be performed by application 504. Application 504 may include, for example, a program (e.g., management software 304 of FIG. 3) for managing the pattern contents across multiple racks 301 (FIG. 3) based on workload and human interaction usage patterns as discussed further below in association with FIG. 6.

Referring again to FIG. 5, read-only memory ("ROM") 505 is coupled to system bus 502 and includes a basic input/output system ("BIOS") that controls certain basic functions of administrative server 303. Random access memory ("RAM") 506 and disk adapter 507 are also coupled to system bus 502. It should be noted that software components including operating system 503 and application 504 may be loaded into RAM 506, which may be administrative server's 303 main memory for execution. Disk adapter 507 may be an integrated drive electronics ("IDE") adapter that communicates with a disk unit 508, e.g., disk drive. It is noted that the program for managing the pattern contents across multiple racks 301 based on workload and human interaction usage patterns, as discussed further below in association with FIG. 6, may reside in disk unit 508 or in application 504.

Administrative server 303 may further include a communications adapter 509 coupled to bus 502. Communications adapter 509 interconnects bus 502 with an outside network (e.g., network 103 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, a pattern may be deployed on multiple racks (commonly referred to as a "domain") to increase support for high availability and disaster recovery. For example, a pattern consisting of a set of virtual machines and the software running on these virtual machines is deployed on each rack within a "domain" of racks. In this manner, the workload handled by the virtual machines of the pattern on a rack that fails may be routed to be handled by the virtual machines of the pattern on another rack of the domain. The content of the pattern, such as the operating system images, middleware binaries and other artifacts, may be obtained from external repositories. While fetching such content from external repositories may be possible, the performance of the system may be diminished due to the time it takes to retrieve such content, especially if such content (e.g., operating system image) is stored in very large files (e.g., multiple gigabytes). Furthermore, a rack may be rendered non-operational in situations where the external repository failed or the network connection to the external repository from the rack was interrupted. As a result, there has been a preference to store the content needed for pattern deployments on all of the racks of the domain locally. However, there is not currently a means for determining which content is necessarily needed for pattern deployment on these racks. Neither is there currently a means for transferring such content from one of the racks of the domain to the other racks of the domain so that they all contain the same content in an order based on priority. Since a rack may fail or the network connection to the rack may be interrupted, it may be wise to transfer those contents that are most important prior to those that are less important.

The principles of the present invention provide a means for managing pattern contents across multiple racks, such as by transferring a subset of the contents of a pattern from one of the racks of the domain to the other racks of the domain that are needed to deploy the pattern in an order based on a priority established by analyzing the workload and human interaction usage patterns as discussed below in connection with FIG. 6.

Figure 6:
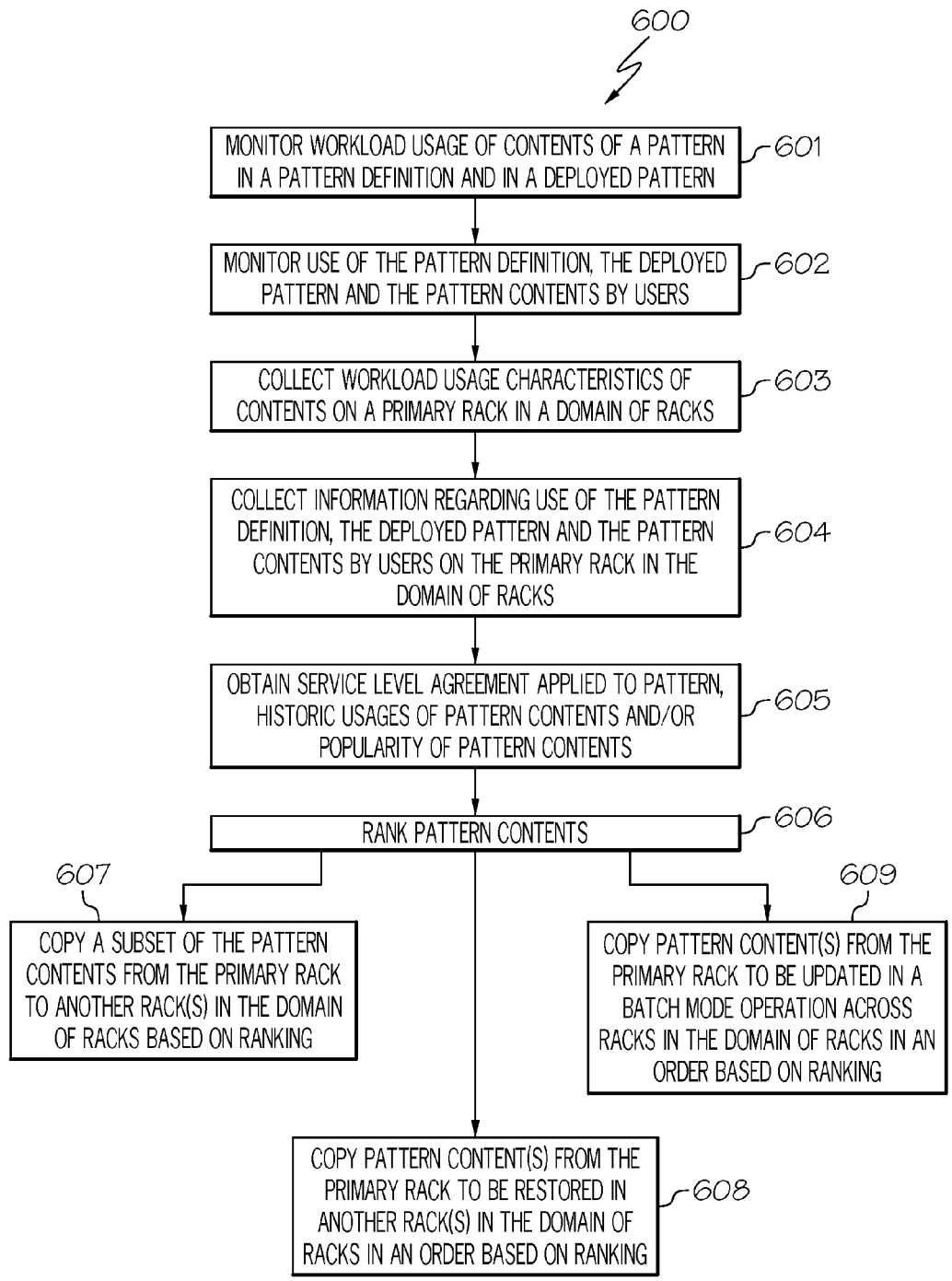
FIG. 6 is a flowchart of a method for managing pattern contents across multiple racks based on workload and human interaction usage patterns in accordance with an embodiment of the present invention.

FIG. 6 is a flowchart of a method 600 for managing pattern contents across multiple racks 301 (FIG. 3) based on workload and human interaction usage patterns in accordance with an embodiment of the present invention.

Referring to FIG. 6, in conjunction with FIGS. 1-5, in step 601, administrative server 303 monitors the workload usage of the pattern contents in a pattern definition and in a deployed pattern. As discussed above, the contents of a pattern may include images, files, middleware binaries, scripts, plug-ins (contain the components, policies and links of the virtual application pattern, where a virtual application pattern is a complete set of platform resources that fulfill a business need, including web applications, databases, user registries, messaging services and transaction processes) and pattern types (collection of plug-ins). A "pattern definition" refers to the pattern defined by the user (i.e., the user receiving the services provided by the cloud computing environment). The "deployed pattern" refers to the middleware and applications that were actually deployed across multiple racks 301 which may be different from the middleware and applications defined in the pattern definition. For example, some of the images that are part of the pattern definition may be not be deployed on a virtual machine 408 in rack 301.

Examples of monitoring the workload usage of the pattern contents in a pattern definition and in a deployed pattern include monitoring the usage of images, files, middleware binaries, scripts, plug-ins and pattern types that were defined in the pattern definition and those that were actually deployed in the pattern. For instance, by monitoring the workload usage of the pattern contents in the pattern definition and in the deployed pattern, the contents that were not used in the pattern definition may be identified thereby indicating that such contents are not needed and designated as low priority (i.e., ranked low priority). Monitoring the workload usage of the pattern contents in the pattern definition and the deployed pattern may include monitoring for errors, such as errors that occurred during the deployment, as well as for monitoring for updates, such as updates to images, etc. When errors occur, those contents that are associated with such errors may be designated as low priority. Furthermore, when an update occurs, those contents that are associated with such updates, may be designated as a high priority as it is necessary to ensure that racks 301 contain the latest versions of the pattern contents. Additionally, monitoring the workload usage of the pattern contents includes monitoring the extent of utilization of these contents. For instance, some of the contents may hardly be utilized; whereas, other contents may be utilized extensively. Those contents that are utilized more extensively are designated with a higher priority and those contents that are hardly utilized are designated with a low priority.

In step 602, administrative server 303 monitors use of the pattern definition, the deployed pattern and the pattern contents by users (collectively referred to as monitoring the "human interaction usage patterns"). For example, monitoring the human interaction usage patterns may involve monitoring actions, such as edits to the pattern definition, execution of the script packages during the pattern deployment, the length of time the deployed pattern has been running and meeting the user's requirements in servicing the workload, how traffic is routed and delegated to the deployments, editing of the contents by the users, etc. Furthermore, log entries that detail such activities may be monitored and examined.

In step 603, administrative server 303 collects the workload usage characteristics of the pattern contents, as discussed above, on a primary rack 301 in a domain of racks (e.g., racks 301A, 301N) based on monitoring the workload usage of the pattern contents in the pattern definition and in the deployed pattern. A user designates a rack 301 in a domain of racks (e.g., racks 301A, 301N) to collect the workload usage characteristics of the pattern. Such a rack 301 is deemed to be the "primary rack." Any rack 301 in the domain of racks may be designated as a primary rack and is not to be interpreted as being a "master" rack. All racks 301 that are part of the domain are peers and share their content as needed for pattern deployment.

In step 604, administrative server 303 collects information regarding human interaction usage patterns on a primary rack 301 in the domain of racks (e.g., racks 301A, 301N) based on monitoring the human interaction usage patterns as discussed above.

In step 605, administrative server 303 obtains the service level agreement applied to the pattern, the historic usages of the pattern contents and/or the popularity of the pattern contents. In one embodiment, such information may be stored in database 305.

In step 606, administrative server 303 ranks the pattern contents by analyzing the collected workload usage characteristics of the pattern contents, analyzing the collected information regarding the use of the pattern definition, the deployed pattern and the pattern contents by the users as well as analyzing the service level agreement applied to the pattern, historic usages of pattern contents and/or popularity of pattern contents. For example, contents that are more utilized and popular would be ranked higher than contents that are less utilized or less popular. In another example, service level agreements may be utilized to prioritize pattern contents by analyzing the service level agreement. For instance, the service level agreement may have a required deploy time that would make it necessary to load larger sized contents first even though they may be less likely to be used and load the smaller sized contents at deploy time in order to guarantee the required deploy time specified in the service level agreement. It is noted that the ranking discussed herein is not a static ranking, but instead, is adjustable based on the workload and human interaction usage patterns.

Once the pattern contents are ranked, such ranking may be used in many ways, such as by determining the contents that would most likely be utilized in the pattern. Those contents that are highly ranked are deemed to be more likely to be utilized in the pattern and therefore are the contents that are copied from the primary rack 301 to the other racks 301 of the domain. For instance, in step 607, administrative server 303 determines the contents that would most likely be utilized in the pattern based on the ranking, while taking into consideration factors, such as service level agreement agreements, thereby allowing administrative server 303 to copy and store the pattern contents that are truly needed in the local repository of the other rack(s) 301 in the domain and not storing contents that are not needed thereby freeing up space. That is, in step 607, administrative server 303 copies a subset of the pattern contents on the primary rack 301 to another rack(s) 301 in the domain based on the ranking.

Furthermore, in the case of backing up content on a primary rack 301, such ranking may be used by administrative server 303 in step 608 to determine the order of the pattern contents to be restored from the primary rack 301 to the other rack(s) 301 of the domain thereby transferring those contents that are most important prior to those that are less important preventing the loss of such contents in case of a rack failure or a network connection interruption. That is, in step 608, administrative server 303 copies pattern content(s) from the primary rack 301 to be restored in another rack(s) in the domain of racks (e.g., racks 301A, 301N) in an order based on the ranking.

Additionally, such ranking may be used by administrative server 303 in step 609 to determine the order of the pattern contents to be updated in a batch mode operation across all the racks 301 of the domain thereby updating those contents that are most important prior to those that are less important thereby preventing the loss of such updated contents in case of a rack failure or a network connection interruption. That is, in step 609, administrative server 303 copies pattern content(s) from the primary rack 301 to be updated in a batch mode operation across the racks 301 in the domain of racks (e.g., racks 301A, 301N) in an order based on the ranking.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for managing pattern contents across multiple racks, the method comprising:

monitoring workload usage of contents of a pattern in a pattern definition and in a deployed pattern, wherein said pattern is a model of a topology and application environment that encapsulates installation, configuration and management of middleware and applications that run on virtual machines in physical compute nodes in a domain of racks, wherein said pattern definition is said pattern defined by a user;

monitoring usage of said pattern definition, said deployed pattern and said contents of said pattern by users;

collecting said workload usage characteristics of said contents of said pattern on a primary rack in said domain of racks based on said monitoring of said workload usage of said contents of said pattern in said pattern definition and in said deployed pattern;

collecting information regarding use of said pattern definition, said deployed pattern and said contents of said pattern by said users on said primary rack in said domain of racks based on said monitoring of said usage of said pattern definition, said deployed pattern and said contents of said pattern by said users;

ranking, by a processor, said contents of said pattern by analyzing said collected workload usage characteristics of said contents of said pattern on said primary rack in said domain of racks and analyzing said collected information regarding use of said pattern definition, said deployed pattern and said contents of said pattern by said users;

copying a subset of said contents of said pattern on said primary rack to one or more other racks in said domain of racks based on said ranking which corresponds to content that is needed for pattern deployment on said one or more other racks in said domain of racks thereby freeing up memory space in said one or more other racks in said domain of racks by not storing contents of said pattern that are not needed for pattern deployment; and servicing a customer in a cloud computing environment using said pattern deployed in said domain of racks.

2. The method as recited in claim 1 further comprising:
copying one or more contents of said pattern from said primary rack to be restored in one or more other racks in said domain of racks in an order based on said ranking.

3. The method as recited in claim 1 further comprising:
copying one or more contents of said pattern from said primary rack to be updated in a batch mode operation across said racks in said domain of racks in an order based on said ranking.

4. The method as recited in claim 1 further comprising:
obtaining one or more of a service level agreement applied to said pattern, historic usages of said contents of said pattern and popularity of said contents of said pattern; and ranking said contents of said pattern by analyzing said collected workload usage characteristics of said contents of said pattern on a primary rack in a domain of racks, analyzing said collected information regarding use of said pattern definition, said deployed pattern and said contents of said pattern by said users and analyzing one or more of said service level agreement applied to said pattern, said historic usages of said contents of said pattern and said popularity of said contents of said pattern.

5. The method as recited in claim 1, wherein said contents of said pattern comprise one or more of the following: images, files, middleware binaries, scripts, plug-ins and pattern types.

* * * * *